May 10, 1949.  G. L. TAWNEY  2,469,419
ENERGY DIRECTING APPARATUS
Filed Oct. 26, 1943
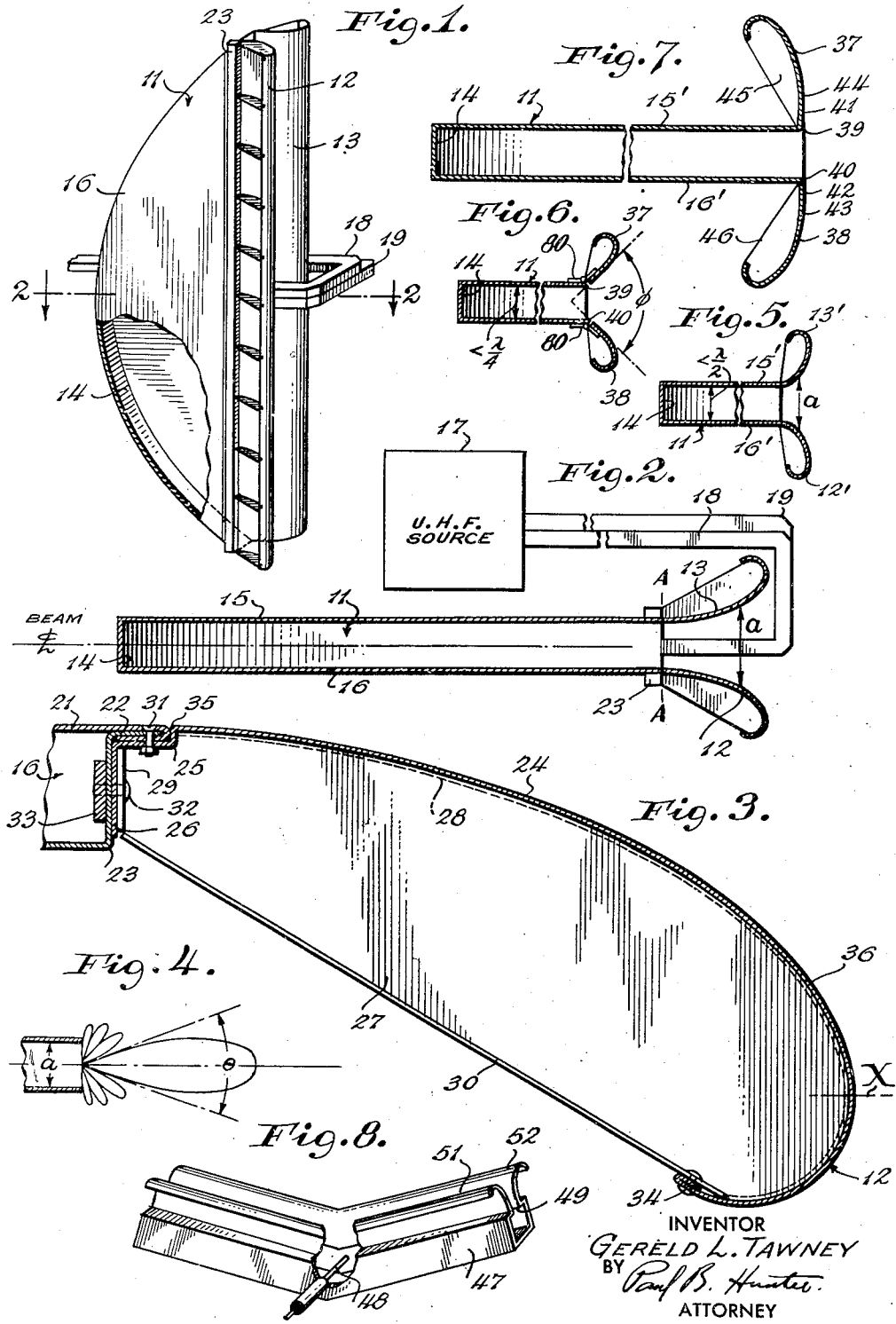
INVENTOR
GERELD L. TAWNEY
BY
ATTORNEY Patented May 10, 1949

2,469,419

UNITED STATES PATENT OFFICE 2,469,419

ENERGY DIRECTING APPARATUS

Gereld L. Tawney, Hempstead, N. Y., assignor to The Sperry Corporation, a corporation of Delaware Application October 26, 1943, Serial No. 507,721

15 Claims. (Cl. 250—33.65)

This invention relates to electromagnetic wave energy transducer or transfer devices such as transmitters and receivers, and is particularly concerned with arrangements for effecting desired interchange of wave energy between such devices and free space.

In its preferred embodiment the invention will be described as associated with a parabolic wave energy reflector such as is used for directionally defining the glide path in a radio instrument landing system, but it will be understood that the true scope of invention is indicated rather by the claims.

Reflectors employed in such directional systems are usually made rather narrow, with closely spaced parallel side walls for maintaining desired control over the energy between the reflecting surface and the relatively narrow reflector mouth. It has been found difficult to controllably restrict the lateral angular spread of the beam issuing from such narrow mouth reflectors, and usually secondary lobes are present in the radiation pattern, which is objectionable in aircraft landing and like systems. In its preferred embodiment, my invention is directed to control of the lateral beam angle and to reduction or elimination of secondary lobes.

A major object of the invention is to provide novel electro-magnetic wave energy transducer or transfer devices formed for effecting efficient and controlled wave energy interchange with free space.

It is a further object of the invention to provide novel electromagnetic wave energy transducer arrangements providing reliable beam angle control and reduction of side lobes in the radiation patterns.

A further object of the invention is to provide novel electromagnetic wave energy transducer devices having oppositely flaring wave energy guide surfaces which are electrically continuous and of continuously increasing curvature, the angularity and/or rate of curvature of said surfaces determining beam characteristics.

A further object of the invention is to provide a novel transmitter reflector device having opposed electromagnetic wave guiding side walls terminating in oppositely diverging substantially continuously curving surface portions.

A further object of the invention is to provide a wave guide radiator adapted to lose wave energy along its length and having oppositely diverging and substantially continuously curving launching plates directively controlling said energy.

Further objects of the invention will appear as the description proceeds in connection with the annexed claims and the appended drawings wherein:

Figure 1 is a substantially perspective view of a transmitter reflector device embodying the invention;

Figure 2 is an enlarged section along line 2—2 of Figure 1 illustrating constructional details of Figure 1;

Figure 3 is an enlarged section illustrating detailed construction of one side wall extension or flap of Figures 1 and 2;

Figure 4 is an explanatory graphic illustration;

Figure 5 is a fragmentary sectional view similar to Figure 2, and illustrating flaps having greater rates of increasing curvature than those of Figure 2;

Figure 6 is a fragmentary sectional view similar to Figure 1 but illustrating flaps arranged in desired angular relation to the reflector side walls;

Figure 7 is a fragmentary sectional view similar to Figure 6, illustrating a further wide angle embodiment of the invention; and Figure 8 is a substantially perspective view of a wave guide radiator device embodying the invention.

Referring to Figures 1–4, the therein illustrated embodiment of the invention comprises a relatively narrow metal reflector 11 provided along its mouth with substantially identical wave guiding extensions 12 and 13, commonly and hereinafter designated as flaps.

Reflector 11 is formed with a cylindrical parabolic or otherwise suitable curved reflecting surface 14 facing in the direction it is desired to direct a beam of electromagnetic energy. As illustrated in Figures 1 and 2, reflector surface 14 is relatively narrow and reflector 11 is provided with substantially parallel, internally flat, conductive side wall assemblies 15 and 16. The reflector depth is preferably such that walls 15 and 16 extend to focal axis A—A of the parabola.

Electromagnetic wave energy is supplied to reflector 11 from a suitable ultra high frequency source designated at 17 by means of substantially coextensive wave guides 18 and 19 having discharge mouths facing surface 14 and located preferably at the focus of surface 14.

Convenient and suitable supports are of course provided for mounting wave guides 18 and 19 in association with reflector surface 14, but since neither the above described specific reflector structure nor the specific manner of introducing wave energy thereinto is important to this embodiment of the invention, further description or illustration is not necessary, the diagrammatic arrangement of Figure 2 being sufficient for understanding the invention.

The invention, as illustrated in Figures 1–7, comprises chiefly obtaining reliable lateral beam angle definition and reduction of objectionable side lobes in the radiation pattern by predetermined construction of the flaps.

Before proceeding to further details of the invention, a brief explanation of certain principles involved therein will be given here in connection with Figure 4. Suppose electromagnetic wave energy is emitted or received at an aperture having an arbitrary width $a$. It is known that the resultant radiation pattern will include a beam having an angular width denoted by angle $\theta$, and probably a plurality of side lobes as illustrated. The angular width of the beam, as is also known, may be defined by the expression $$\theta = 2 \sin^{-1} \frac{\lambda}{a}$$

where $\lambda$ is the wavelength at the operating frequency.

The mouth of the reflector employed in the illustrated embodiments of the invention is narrow, much less than a wavelength at the operating frequency in width as indicated in Figures 5 and 6, to insure control over the redirected energy. This means that the radiation pattern will have side lobes, since only in special cases such as where $\lambda < a$ are side lobes absent, unless special measures are taken.

The problem present is to transfer the wave energy from the reflector mouth into space as a radiation pattern having a desired beam width, and this transfer must be made smoothly to avoid undesired energy reflections which may produce side lobes in the radiation pattern.

Since the effective angular width of the beam is determined by the effective width of the aperture through which the beam eventually leaves the reflector, the beam width can be predetermined by suitably forming and arranging the flap surfaces. The place where the flap surfaces lose guiding control over the beam can be considered the effective aperture of the reflector.

One manner of accomplishing this is to suitably flare the flap surfaces outwardly from the reflector mouth at constantly increasing curvature. Where the rate of increase in curvature is small, as in Figure 2, $a$ will be large by the time the flap surfaces lose control over the beam, and consequently the angular beam width $\theta$ will be small.

If the rate of curvature is higher, as in Figure 5, the flap surfaces soon lose control of the major characteristics of beam and the angular beam width $\theta$ will be larger. That is, by major characteristics of the beam is meant the essential shape of the main lobe of the beam as taken at the angular half-power width. It is known that if in linear electromagnetic energy horns the rate of taper is made proper, the beam width thereof will not be effected by changing its length as it is taken beyond a certain minimum. The effect, therefore, of continuing the flare of the horn with increasing radius of curvature, as in the present invention, has the effect of eliminating discontinuities and results in a smoother radiation pattern without affecting the beam width. This is so because the abrupt discontinuities present in other guiding surfaces and shown in the prior art are hereby eliminated. In this manner, the building-up of large oscillating line charges due to such abrupt discontinuities is prevented. In effect, therefore, although the flaps of the present device may, with increasing radius of curvature, lose some control over the main lobe of the beam, their effect on the side lobes, because of the spiral and curved nature of the flaps, results in a general smoothness of the entire radiation pattern which is quite marked and absent from prior devices. This arrangement of Figures 1–5 is of course preferable where small beam widths are desired.

For obtaining adequate control over wide angle patterns, the aperture must be greater than predicted by the above equation. In such case, I arrange the flaps angularly with respect to the reflector mouth and so as to substantially enclose an angle $\phi$ (Figure 6) corresponding to the desired beam angle. Here $\phi$ is approximately equal to $\theta$.

For intermediate beam widths, the desired aperture may be obtained either by suitably flaring or angularly disposing the flap surfaces or some combination of the two.

In all the above arrangements, the flap surfaces are terminated in surface regions of continuously increasing curvature to avoid sharp electrical discontinuities with space.

Two different arrangements for securing desired beam angle definition are illustrated in Figures 1–7. In Figures 1–5, the flaps are formed with inner wave guiding surfaces which are outwardly flaring continuations of the adjoining reflector side wall surfaces. In Figures 6 and 7, the flaps are arranged angularly with respect to the reflector side walls. In both arrangements, the flap surfaces terminate in regions of continuously increasing curvature, so that the flap surfaces merge into space without abrupt electrical discontinuities to thereby prevent undesired beam distorting reflections and reduce or eliminate undesired side lobes from the radiation pattern.

In the arrangement of Figures 1–5, the rate of increase in curvature of the flaring wave guiding surfaces of the flaps determines the effective aperture width and hence determines the angular beam width as in the first case above explained. Figures 6 and 7 illustrate the wide angle beam pattern example where the relative angularity of the flaps determine the angular beam width.

Where the flaps are angularly disposed with respect to the reflector side walls, as in Figures 6 and 7, the width of the reflector mouth or aperture should be quite small, preferably less than one quarter of the wave length at the operating frequency. In the flared flap arrangement of Figures 1–5, however, the reflector aperture may be wider, but it should not be more than one half the wave length at the operating frequency. If the apertures are wider, the issuing wave front will be appreciably non-spherical or non-cylindrical and difficult or impossible to control by wave guiding surfaces such as the flaps.

An electrically continuous surface, as contemplated herein, is a surface wherein discontinuities in the curvature thereof are separated by much less than one quarter of the wave length at operating frequency.

Referring now to Figures 2 and 3, side wall assembly 16 comprises a sheet metal inner wall 21 reversely bent to form a flange 22 embracing a projecting lip of a box girder 23 extending parallel to the reflector mouth. Flap 12 comprises an elongated sheet metal member 24 extending along the entire reflector mouth. Member 24, along its inner side, is inwardly bent to form a recessed shoulder 25 for matingly receiving flange 22, and is outwardly bent at 26 to lie in flush contact with girder 23.

At suitably spaced intervals along flap 12, lateral rib plates 27 are provided for strengthening member 24. Plates 27 are each provided with downwardly bent side flanges 28 formed to fit with the curvature of the back of member 24, an end flange 29 flush with member 26, and upwardly bent side flanges 30 for strength and for attachment of the outer side of member 24.

Flap 12 is secured in very good conductive contact with wall 21, as by machine screw and bolt assemblies 31 between flange 22 and shoulder 25, and bolts 32 extending through flange 29, extension 26 from wall 24 and girder 23 into threaded engagement with a heavy metal backing strip 33 rigidly fastened as by welding within girder 23. The outer side of member 24 is secured to flanges 30, as by rivets 34, and flange 28 is preferably spot welded to member 24.

Any equivalent manner of providing a flap 24 as a conductive extension of wall 21 is within the scope of the invention, the mounting details of Figure 3 merely indicating one mode of mounting the flap.

As above-indicated, the inner surface of reflector side wall 21 is substantially planar. The above described attachment of flap 12 to side wall assembly 16 is designed to insure that the curved surface of member 24 facing the beam starts at point 35 as an electrical and preferably substantially a physical continuation of the planar inner surface of wall 21. The planar surface of wall 21 is preferably tangent to surface 24 at point 35.

Starting with point 35, the surface of member 24 continuously and gradually curves outwardly away from the indicated vertical beam center line, the rate of curvature preferably uniformly increasing until reaching a point indicated generally at 36 determined by practical considerations such as necessary and permissible dimensions. Beyond point 36, member 24 is preferably curved continuously but more rapidly until it extends rearwardly and may be attached to flange 30 as illustrated. In this manner, the inner surface of member 24 is made to terminate and merge with space without introducing any sharp electrical discontinuities with respect to the beam projected by the reflector.

The bowed construction of member 24, the employment of reinforcing plates 27, and the structurally solid nature of the joint attaching flap 12 to side wall assembly 16 all contribute to provide a structure which is mechanically strong and self-supporting.

At the other side of the reflector assembly, flap 13 is identical with flap 12 and is preferably joined to reflector side wall assembly 15 in the identical manner that flap 12 is joined to side wall assembly 16.

In operation, energy having different modulation or other characteristics is delivered to the reflector by guides 18 and 19, and is projected in beam form through the reflector mouth, the side walls 21 and flaps 12, 13 functioning as wave guiding surfaces for delivering a desired beam pattern into space.

The above described gradually flaring and continuously curved flaps have been found to considerably reduce secondary lobe formation, for example to such an extent as to greatly improve the operation of aircraft landing systems embodying the same.

I believe that this advantageous operation is due to the fact that the wave guiding surfaces especially including the terminating wave guiding surfaces on members 24 are all free from abrupt electrical discontinuities, and are thus so formed as to transfer the wave energy into space without the introduction of appreciable disturbing reflections. Reduction of such reflections results in substantial elimination of stray, uncontrolled energy which otherwise would tend to interfere with the issuing waves and produce the objectionable side lobes, and thereby increases the total strength of the utilizable beam in the radiation pattern.

In my opinion the optimum curvature for the inner wave guiding surface of each member 24 between points 35 and 36 is probably that following an exponential formula. However, as a practical matter, it is not essential that surfaces 24 follow such precise mathematical contours. For most practical applications of the invention it has been found satisfactory that surfaces 24 be effectively of continuously increasing curvature as above set forth, especially beyond point 36.

For optimum results, the gradual curvature of surfaces 24 could be extended almost indefinitely, but for practical considerations each flap should be terminated as soon as possible since wide flaps are unwieldy. Beyond points 36, which substantially determine the effective aperture width, the surfaces of members 24 exert little beam angle control since there the beam has such width that the flaring surfaces of member 24 exercise but little guiding function. I have found it most advantageous to smoothly terminate the wave guiding surfaces of members 24 by simply continuing and sharply increasing their curvatures beyond point 36. This also provides a very advantageous mechanically strong structure wherein the outer edge of the flap is tied rigidly to the reflector assembly.

The flared, curvilinearly terminated flaps of my invention result in the production of improved smooth and uniform radiation patterns exhibiting substantially no side lobe energy. There are no electrical discontinuities between adjoining reflector side wall and flap surfaces, and the degree of flare of the flap surfaces determines the lateral beam angle.

It is of course not essential that surface 24 starts to curve exactly at point 35. Surface 24 may start planar and flush with the adjoining surface of wall 21, and then start the above described curvature at a desired point. Further, if desired, the guide surface curvature may commence inwardly of the reflector mouth.

While flaps 12 and 13 have been described as rigid with the reflector assembly, they may be made angularly adjustable, as by connection to side wall assemblies 16 and 17 through hinge-like joints 80. All such joints whether rigid or adjustable should provide very good electrical continuity between the reflector and flaps, by conductivity or through choke joints.

Figure 5 illustrates diagrammatically an effect of increasing the rate of curvature of the wave guiding flap surfaces. Flaps 12' and 13', which may be integral with the reflector side walls 15' and 16', or secured thereto similarly to flaps 12 and 13, are the same as flaps 12 and 13 except for their rate of curvature. The rapidly increasing curvatures of flaps 12' and 13' result in widely flaring flaps which apparently lose guiding control over the issuing waves rather soon and thereby provide wider lateral beam angles than the arrangement of Figure 2. As illustrated, flaps 12' and 13' terminate similarly to flaps 12 and 13 and are tied back to the reflector for structural strength. Reflector side walls 15' and 16' are otherwise substantially the same as side walls 15 and 16.

In summary, therefore, the flaps in the phase of the invention illustrated in Figures 1–5 are electrically continuous with the adjoining reflector side walls, determine the beam angle according to the rate of curvature of the surfaces between points 35 and 36, and terminate in regions of continuously increasing curvature which cooperate to reduce or eliminate formation of side lobes in the radiation pattern.

Figures 6 and 7 illustrate a further embodiment of the invention wherein the flaps are disposed angularly with respect to the reflector side walls to define the beam angle, rather than curvilinearly flaring therefrom.

Integral flaps 37 and 38 extend from side walls 15' and 16' in oppositely diverging angular relation. Such construction results in the formation of decided corners indicated at 39 and 40 between adjoining wave guiding surfaces of the reflector side walls and the flaps. These corners produce electrical discontinuities in said wave guiding surfaces which may cause uncontrolled reflections. I have found that the effect of such discontinuities may be reduced or eliminated by forming at least a portion of the flap surfaces beyond the corners of continuously increasing curvature and by terminating the flaps substantially exactly as described above in connection with Figures 1–5.

For some constructions, the flap surfaces just beyond the corners may simply be flat surfaces, indicated at 41 and 42, disposed at a selected angle to the reflector side walls. Such angularly arranged flat flap surfaces afford good control over the beam angle but they often cause the formation of objectionable side lobes in the radiation pattern.

To prevent these side lobes, the flap surfaces are continuously curved at an increasing rate, starting with some points such as indicated at 43 and 44. Between points 43, 44 and the outer edges of the flaps, the wave guiding flap surfaces are formed similarly to surfaces 24 above described. For best results it may be advisable to locate points 43, 44 at corners 39, 40. For some purposes it may be sufficient to simply terminate flat surfaced flaps with a region of rapidly increasing curvature similar to that beyond point 36 of Figure 3. In any event, the angularly disposed flaps are terminated with regions of continuously increasing curvature which electrically merge smoothly into space.

Flaps 37 and 38 extend along the reflector mouth similarly to flaps 12', 13' and are tied rigidly to reflector 11 as by brackets 45, 46 similar to plates 27.

Figures 6 and 7 illustrate different angular arrangements of the flaps, Figure 7 illustrating that good results can be obtained up to extreme flap angles. The embodiment of Figures 6 and 7 is preferable where wide beam angles are desired, as it is difficult in such cases to properly flare surfaces such as 24.

Figure 8 illustrates application of the invention to a hollow wave guide device which is apertured along its length to permit escape of energy therealong. The illustrated device comprises two rigidly connected angularly disposed similar wave guide sections 47 into which electromagnetic wave energy is supplied in similar phase and intensity as from a suitable antenna means 48. Wave energy from antenna 48 travels longitudinally along guide sections 47 which are longitudinally apertured at 49 to permit the egress of such wave energy. Such wave guide radiators and their theory of operation is known. The angle between the wave guide sections determines the beam pattern in the desired direction. My invention here comprises the provision of oppositely diverging launching plates 51 and 52 along aperture 49 in both guide sections. Plates 51 and 52 are formed similarly to the curved flaps of any of the above described embodiments of the invention and function similarly to effectively control the lateral beam angle as well as to reduce the formation of side lobes in the radiation pattern.

The above described arrangements are employed whether the devices of the invention are employed for radiation or reception of electromagnetic wave energy. The term transducer as used herein is intended to refer to any such device capable of radiation and/or reception of electromagnetic energy.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electromagnetic wave energy transfer device comprising a curved reflector having an aperture defining a principal direction of wave propagation, means providing oppositely extending wave energy guide surfaces adjacent said aperture for controlling the concentration of said wave energy in said principal direction of propagation, and means providing terminal surface regions of continuously increasing curvature such that said terminal surfaces at least reverse their direction relative to said principal direction, said last-named means being electrically continuous with said guide surfaces for reducing undesired reflections of said wave energy.

2. The device defined in claim 1, wherein said guide surfaces comprise oppositely curved surfaces merging into said terminal surface regions.

3. The device defined in claim 1, wherein said guide surfaces comprise substantially flat surfaces angularly and oppositely disposed adjacent said aperture and merging into said terminal regions.

4. The device defined in claim 1, wherein said guide surfaces comprise substantially coplanar surfaces oppositely disposed adjacent said aperture and merging into said terminal surface regions.

5. An electromagnetic wave energy transfer device comprising a beam controlling reflector, and means for producing a desired radiation pattern defining a principal direction of wave propagation comprising means associated with said reflector providing oppositely extending wave energy guide surfaces for determining angular spread of said radiation pattern in said principal direction and means providing terminal surface regions of continuously increasing curvature such that said terminal surfaces at least reverse their direction relative to said principal direction, said last-named means being electrically continuous with said guide surfaces for reducing undesired reflections of said wave energy and effecting controlled exchange of said wave energy with space.

6. The device defined in claim 5, wherein said guide surfaces comprise oppositely flaring, continuously curved surfaces merging smoothly into said terminal surface regions.

7. The device defined in claim 5, wherein said reflector is provided with substantially parallel side wall surfaces, and said guide surfaces comprise oppositely and angularly disposed extensions of said side wall surfaces merging smoothly into said terminal surface regions.

8. In an electromagnetic wave energy radiating system, a reflector having an aperture of width not more than one wave length of said energy at the operating frequency, directional wave guiding means disposed at said aperture and directed toward said reflector for supplying wave energy to be redirected as a beam by said reflector, and means associated with said reflector providing opposed lateral surfaces for electrically guiding and shaping said reflected waves, said surfaces terminating in diverging oppositely curved regions.

9. An electromagnetic wave energy radiator comprising a cylindrical parabolic reflector having an aperture of width not more than one wave length of said energy at the operating frequency, means for supplying wave energy to be redirected as a path defining beam by said reflector, side wall means on said reflector providing opposed substantially parallel wave guide surfaces, and means providing outwardly flaring substantially continuously curved wave guide surfaces constituting substantial continuations of said parallel surfaces.

10. The radiator defined in claim 9, wherein said outwardly flaring surfaces are supported on substantially parallel members secured along opposite sides of said aperture.

11. A transmitting system comprising a cylindrical parabolic reflector having an aperture defining a principal direction of wave propagation, a source of electromagnetic wave energy, wave guide means having an input terminal connected to said source and an output terminal disposed in the focal zone of said aperture, said output terminal being arranged to direct a beam of electromagnetic energy toward said reflector in a direction substantially opposite said principal direction of propagation, and flaps extending along opposite sides of said aperture, said flaps providing gradually flaring surfaces of substantially continuously changing curvature such that said flaring surfaces at least reverse their direction relative to said principal direction for controlling the electrical characteristics of said beam.

12. A reflector for controlling the transfer of electromagnetic energy comprising a curved reflecting surface having spaced parallel edges, means disposed along said edges perpendicularly to said reflecting surface and providing opposed substantially parallel wave guide surfaces, and means having rolled ends associated with said parallel surfaces providing outwardly flaring substantially spiralled wave guide surfaces which are substantially free from physical discontinuities.

13. A reflector for controlling the transfer of electromagnetic energy comprising a cylindrical parabolic reflecting surface having spaced parallel edges, side walls disposed along said edges perpendicularly to said reflecting surface and providing opposed substantially parallel wave guide surfaces, and means having rolled ends providing outwardly flaring substantially continuously curved wave guide surfaces constituting substantial continuations of said parallel surfaces for directing the electromagnetic energy.

14. A reflector for controlling the transfer of electromagnetic energy comprising a cylindrical parabolic reflecting surface having a pair of spaced parallel edges, side walls disposed along said edges perpendicularly to said reflecting surface and providing opposed substantially plane parallel wave guide surfaces, and flaps extending outwardly from said side walls providing gradually flaring surfaces of substantially continuously changing curvature such that said flaring surfaces at least reverse their direction relative to the plane of said side walls.

15. An electromagnetic wave energy transducer, comprising a preformed reflector having an aperture, means coupling said wave energy to said reflector and spiral flaps having a curvature of substantially 180 degrees extending along said aperture for directing oscillating line charges therealong so as to effect smooth interchange of said electromagnetic wave energy between said reflector and space.

GERELD L. TAWNEY.

REFERENCES CITED

The following references are of record in the file of this patent:

UNITED STATES PATENTS

| Number | Name | Date |
|---|---|---|
| 2,159,481 | House | May 23, 1939 |
| 2,206,683 | Wolff | July 2, 1940 |
| 2,253,501 | Barrow | Aug. 26, 1941 |
| 2,283,935 | King | May 26, 1942 |

FOREIGN PATENTS

| Number | Country | Date |
|---|---|---|
| 770,482 | France | July 2, 1934 |

OTHER REFERENCES

"Biconical Electromagnetic Horns," Proc. I. R. E., vol. 27, No. 12, Dec. 1939, pages 769–779.

Certificate of Correction

Patent No. 2,469,419 May 10, 1949

GERELD L. TAWNEY

It is hereby certified that error appears in the printed specification of the above numbered patent requiring correction as follows:

Column 9, line 28, after the word and comma "frequency," insert *directional wave guiding*;

and that the said Letters Patent should be read with this correction therein that the same may conform to the record of the case in the Patent Office.

Signed and sealed this 16th day of May, A. D. 1950.

[SEAL]

THOMAS F. MURPHY,
*Assistant Commissioner of Patents.*